(12) United States Patent
Moore

(10) Patent No.: US 7,421,712 B2
(45) Date of Patent: *Sep. 2, 2008

(54) DRIVERLESS PRINTING

(75) Inventor: Paul Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

This patent is subject to a terminal disclaimer.

(21) Appl. No.: 11/139,332

(22) Filed: May 27, 2005

(65) Prior Publication Data

US 2005/0223390 A1     Oct. 6, 2005

Related U.S. Application Data

(63) Continuation of application No. 09/258,623, filed on Feb. 26, 1999, now Pat. No. 6,952,831.

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |

(52) U.S. Cl. ...................... 719/327; 719/321
(58) Field of Classification Search .......... 719/321–327
See application file for complete search history.

(56) References Cited

U.S. PATENT DOCUMENTS

| | | | |
|---|---|---|---|
| 5,467,434 | A | 11/1995 | Hower et al. |
| 5,579,529 | A | 11/1996 | Terrell et al. |
| 5,604,843 | A | 2/1997 | Shaw et al. |
| 6,091,507 | A | 7/2000 | Vatland et al. |
| 6,148,346 | A | 11/2000 | Hanson |
| 6,219,153 | B1 | 4/2001 | Kawanabe et al. |
| 6,421,069 | B1 | 7/2002 | Ludtke et al. |
| 6,426,798 | B1 | 7/2002 | Yeung |

OTHER PUBLICATIONS

"The Unicode Standard Version 2.0," The Unicode Consortium, Addison-Wesley Press, 1997.

*Primary Examiner*—Meng-Ai An
*Assistant Examiner*—Diem K Cao
(74) *Attorney, Agent, or Firm*—Lee & Hayes, PLLC

(57) ABSTRACT

A method of creating a peripheral driver for a particular peripheral by learning the peripheral options and the commands for those options from the peripheral itself. The computer access a specified location in the memory of the peripheral which contains either a generic peripheral description file or a pointer to such a file. The file is a text-based file, which contains the peripheral options as name-value entries. The computer parses the file and learns of the available options and the appropriate commands to use those options. The computer is thus able to create a driver for the peripheral.

3 Claims, 6 Drawing Sheets

DRIVERLESS PRINTING

CROSS REFERENCE TO RELATED APPLICATIONS

This application is a continuation of and claims priority to U.S. patent application Ser. No. 09/258,623, the disclosure of which is incorporated by reference herein.

TECHNICAL FIELD

This invention relates generally to a method and system for interfacing with devices, and more particularly to a method for characterizing and customizing printer drivers.

BACKGROUND OF THE INVENTION

Computer systems output data to a variety of output devices, including printers, plotters, and computer controlled machines, such as a manufacturing machines. The operating system of the computer is assigned the task of interfacing with these peripheral hardware products so that the appropriate communications protocol and appropriate set of instructions are used by the computer to communicate with the peripheral. Because it is impractical to provide an interface for every device, the operating system provides a standard interface with a given functionality. Each peripheral then uses a device driver to interface with the standard interface of the operating system. The operating system thus controls each peripheral indirectly through the driver.

A goal of the operating system is to provide an application program environment which is independent of the output device used. A graphics device interface (GDI) achieves this goal. The GDI, typically part of the operating system, provides a defined set of functions. Each program, then, outputs its data by using these predefined functions. A peripheral driver translates these functions into a stream of commands to control the particular peripheral for which the driver was designed. The GDI, therefore, acts as a common denominator: the application programs translate their data into GDI functions and the drivers then translate these functions into peripheral commands. The net result is that the peripheral produces output resembling the image the application created on the computer.

Because device drivers were designed to operate a particular device, each peripheral required its own driver. For example, once a user connected a printer to the computer, the user would have find the correct printer driver to operate the printer and translate the image which the computer sought to print into a series of commands for that printer. Installing a printer driver is not a simple task for the user. In order to install the correct driver, and configure it properly, the user is often required to answer detailed questions about both the printer and the computer. For example, the user will have to identify the printer and determine which options are installed on the printer. Such information is not immediately apparent to the user, and thus often requires the user to seek assistance. Should the user enter the wrong information, the incorrect printer driver could be installed, or the correct printer driver could be installed incorrectly. In either case, the user will not have access to all of the functionality of the printer, and may not be able to print at all.

In an effort to simplify the process for users, the operating system of the computer will often contain pre-installed printer drivers for a variety of common printers. Thus, if the user seeks to connect one of the supported printers, the process becomes simplified: the user need only select the printer driver with the same name as the printer. However, this system does not provide any assistance to the user who wishes to use a printer which is not supported by the pre-installed printer drivers. Additionally, because printer options may change between the time that the drivers are incorporated into the operating system and the time the user buys the printer, it is not possible to create printer drivers ex ante which can support all of the options on the user's printer. The result is that, while the correct printer driver may already be installed on the computer, it is not configured to provide access to that printer's newest options.

In an effort to conserve memory on the computer, and thus provide additional, pre-installed printer drivers, a system was developed whereby a driver, called a universal printer driver, or unidriver, contained the vast majority of common printer driver code. Smaller drivers could then be written, using the functionality of the unidriver to control the printer. These smaller drivers, called minidrivers, together with the one unidriver, occupied significantly less computer memory storage than the separate printer drivers they replaced. As a result, a larger number of the minidrivers could be pre-installed with the operating system, lessening the chance that the user's printer would be an unsupported printer.

However, the unidriver-minidriver system did not provide any mechanism by which new functions and printers could be added. New features of printers could not be supported, even if a specific minidriver was written, because the unidriver did not have anywhere this new function could be mapped. Thus, new printer functions could only be added with a new version of the operating system, which contained a new unidriver.

In an effort to provide a more extensible unidriver-minidriver system, a new printer description format called the Generic Printer Description (GPD) was created. The GPD was a text-based printer description format, allowing for easier coding, providing greater human readability, and providing extensibility. The GPD file described all of the features on a printer and how to display those features to the user, and instruct the printer to perform those features. An updated unidriver was also created, which would parse the GPD file and present the options to the user. Thus, new functionality could be added without the need to rewrite the entire unidriver.

Despite the increased simplicity, and efficiency of the unidriver-GPD system, the user is still required to know which GPD file is appropriate for the printer the user seeks to attach to the system. This may be especially difficult in large corporations with a myriad of printers, or institutions where a network administrator may keep all of the disks which shipped with the printer and contained the appropriate GPD file. Even if the user has access to the GPD files, such as through the manufacturer's Internet web site, the user may not know which files are appropriate for the particular printer to which the user is attempting to print.

SUMMARY OF THE INVENTION

Therefore, the present invention is generally directed to a system by which the computer can obtain the necessary information to utilize a particular peripheral from the peripheral itself.

The present invention is also generally directed to a system by which the computer can present peripheral options to the user and utilize those options even though the options may be unknown to the computer.

Generally, an extensible communications protocol will be used to support communications between the peripheral and the computer. When the computer first senses that a device has been connected, the computer can request from the device a generic description file, such as a Generic Printer Description (GPD). The file can contain information such as the type and name of the device, together with functions the device supports, attributes of those functions, and the commands necessary to use those functions. This file can thus convey to the computer the capabilities of the device. The computer can then be further directed to other files which contain additional information, such as color data or font data.

Resident on the computer can be a universal peripheral driver. This universal peripheral driver can be configured to operate a particular peripheral based on the information obtained from that particular peripheral's generic description file, regarding the peripheral's capabilities. Some of the information that the computer obtains may be "unexpected" in the sense that the computer was not pre-programmed to look for it. Such unexpected capabilities can be presented to the user through a user interface. The user can then decide whether to use these capabilities.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
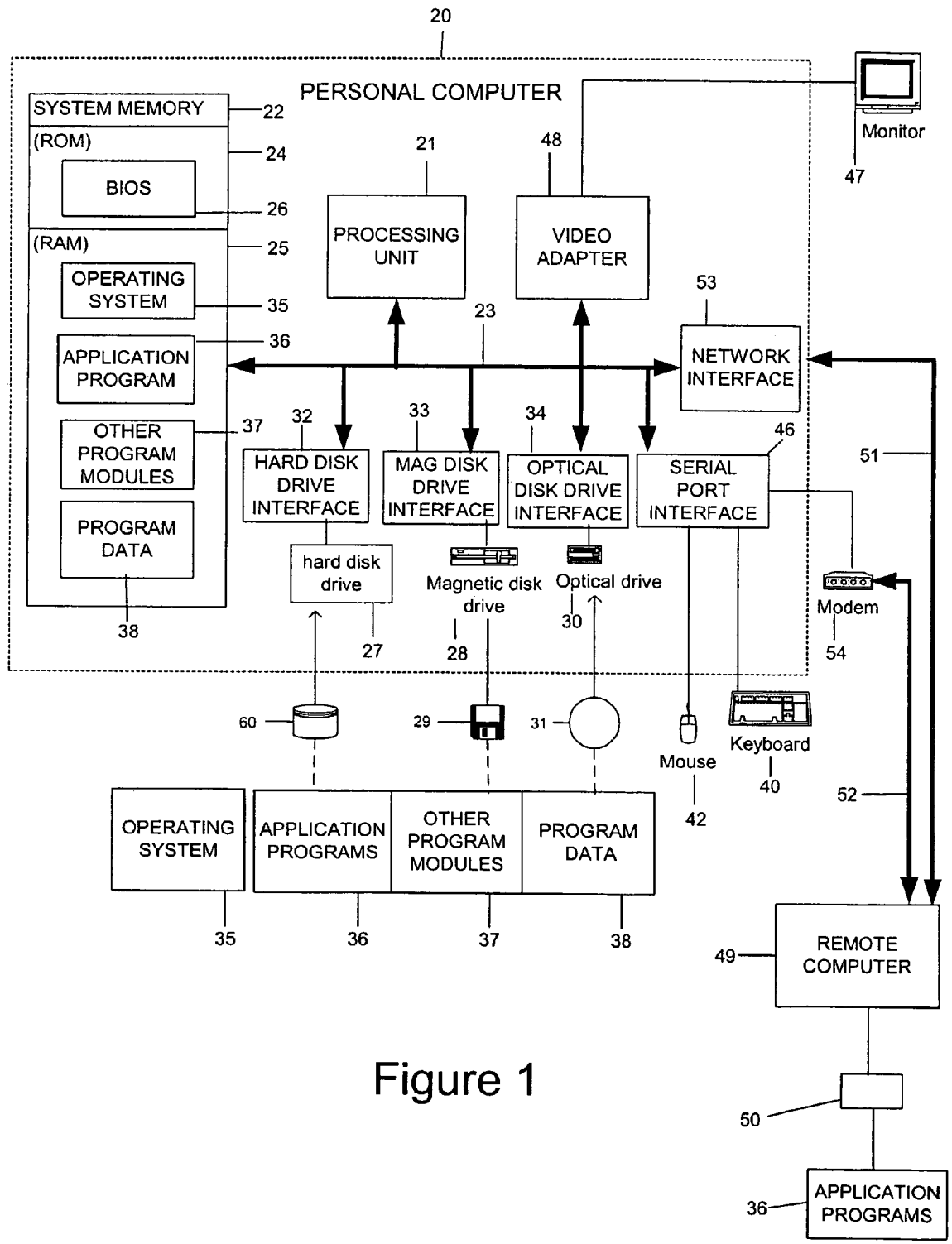
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
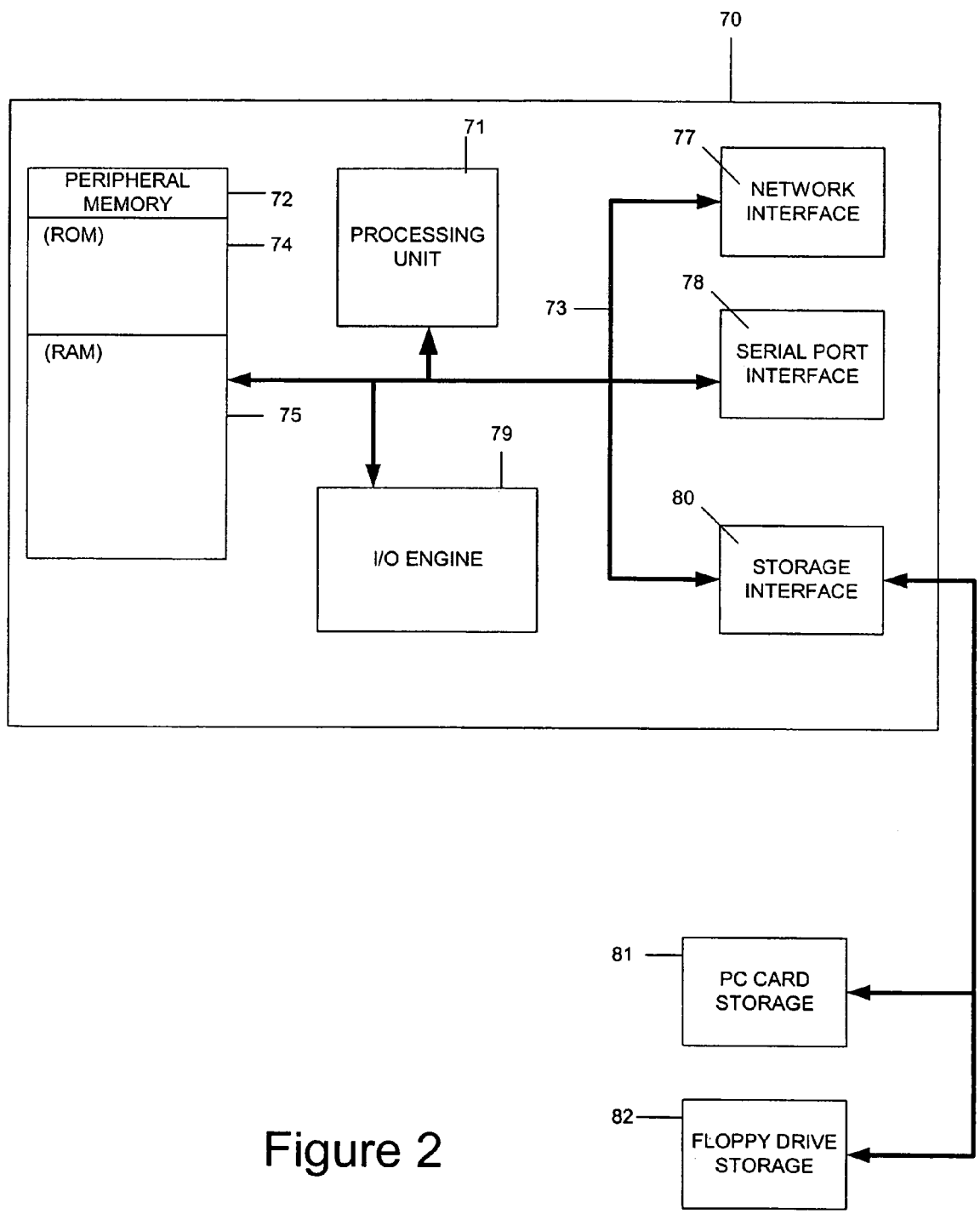
FIG. 2 is a block diagram generally illustrating an exemplary peripheral on which the present invention also resides.

Turning to FIG. 2, an exemplary input/output device for implementing the present invention includes a general purpose peripheral 70, including a processing unit 71, a peripheral memory 72, and a peripheral bus 73 that couples various peripheral components including the peripheral memory to the processing unit 71. The peripheral bus 73 may be any of several types of bus structures including a memory bus or memory controller, and a local bus using any of a variety of bus architectures. The peripheral memory includes read only memory (ROM) 74 and random access memory (RAM) 75.

The peripheral 70 can include a network interface 77, a serial port interface 78, or another type of interface, such as a Universal Serial Bus (USB) interface, or a Small Computer System Interface (SCSI). As will be known by one skilled in the art, any combination of such interfaces can also be incorporated. The peripheral 70 also includes an input/output engine 79, which can operate on various principles known in the art depending on the nature of the peripheral. For example, a printer peripheral could contain a print engine such as ink jet printing, laser printing, dot matrix printing, daisy-wheel printing, thermal transfer printing, or dye sublimation printing. Alternatively, a scanner peripheral could provide for a scan engine such as negative scanning, flatbed scanning, handheld scanning, or digital photography. The peripheral 70 can also have additional storage, through the storage interface 80. Storage interface 80 could be connected to a PC card reader 81, a floppy drive 82, or any other internal or external storage device as would be known in the art.

As will be known by those skilled in the art, peripheral 70 could be a printer, a fax machine, a copier, a scanner, a digital camera, or a computer driven machine, such as a wood cutting machine, or a metal stamping machine. The invention is directed to a system and a method for controlling such peripherals, and is thus not intended to be limited to any one type of peripheral. For clarity only, the following description will be directed to a peripheral 70 which is a printer. However, as will be shown below, the invention is equally applicable to any peripheral.

Figure 3:
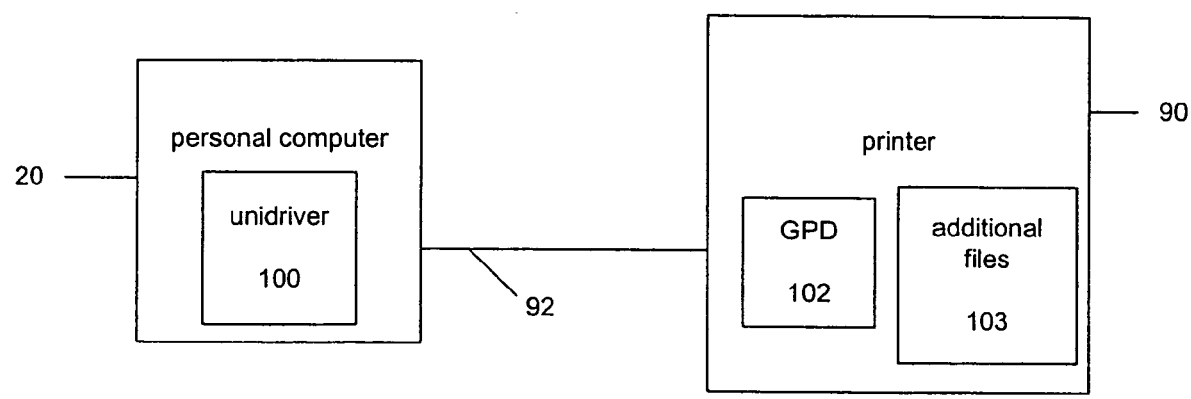
FIG. 3 is a block diagram generally illustrating a connection between a computer and a peripheral.

In accordance with the invention, and turning to FIG. 3, a connection between the printer 90 and the personal computer 20 is shown. Resident on the personal computer 20 is a universal printer driver (unidriver) 100, and resident on the printer is a Generic Printer Description (GPD) file 102. The unidriver 100 interfaces with the operating system 35 and implements common printer driver functions. The GPD file 102 contains the necessary instructions and information so that the universal printer driver 100 can tailor the common printer driver functions to the particular printer 90. The GPD file 102 can also direct the universal printer driver 100 to additional files 103 which contain information to aid the universal printer driver in preparing the commands to the printer. Such files can include an Image Color Management (ICM) profile, or font metrics, such as a Universal Font File (UFF).

The GPD file 102 is a text file which contains all of the options which the printer 90 can possibly implement and the printer instructions to call those options. The options and instructions are presented in a series of name-value pairs called entries, where the name is the name of the option and the value is the value which needs to be sent by the computer 20 to the printer 90 to call the option. The GPD file 102 divides such entries into sections, where each section provides the necessary information to allow the unidriver 100 to present the options to the user through a user interface. The unidriver 100 parses the GPD file 102 in a manner known to those of skill in the art and thus learns the printer's capabilities. The unidriver 100 creates a series of logical connections between the functions it learned from the GPD file 102, the necessary commands to the printer it learned from the GPD file, and the functions it can make available to the operating system 35. For illustrative purposes, an exemplary GPD file for a printer is attached in the appendix.

When an application program 36 seeks to produce hardcopy output, it initiates the output of data by invoking a function of the Graphics Device Interface (GDI) and specifying a destination. The GDI function will then call the corresponding function in the unidriver 100. The unidriver 100 can then create printer commands based on the commands learned from the GPD file 102. For example, a specific printer 70 may be able to support duplex printing, or printing on both sides of a sheet of paper simultaneously. However, the unidriver 100 does not initially know how to instruct the printer to perform this task. The GPD file 102 can contain the appropriate option name and value or code so that the unidriver 100 can instruct the printer 70 to perform duplex printing. The unidriver 100 learns these codes by reading the GPD file 102. The user interface, also obtained from the GPD file 102, can then present the option of duplex printing to the user. If the user selects duplex printing through this user interface, the unidriver 100 sends the command to the printer 90, and the printer performs duplex printing.

Figure 4:
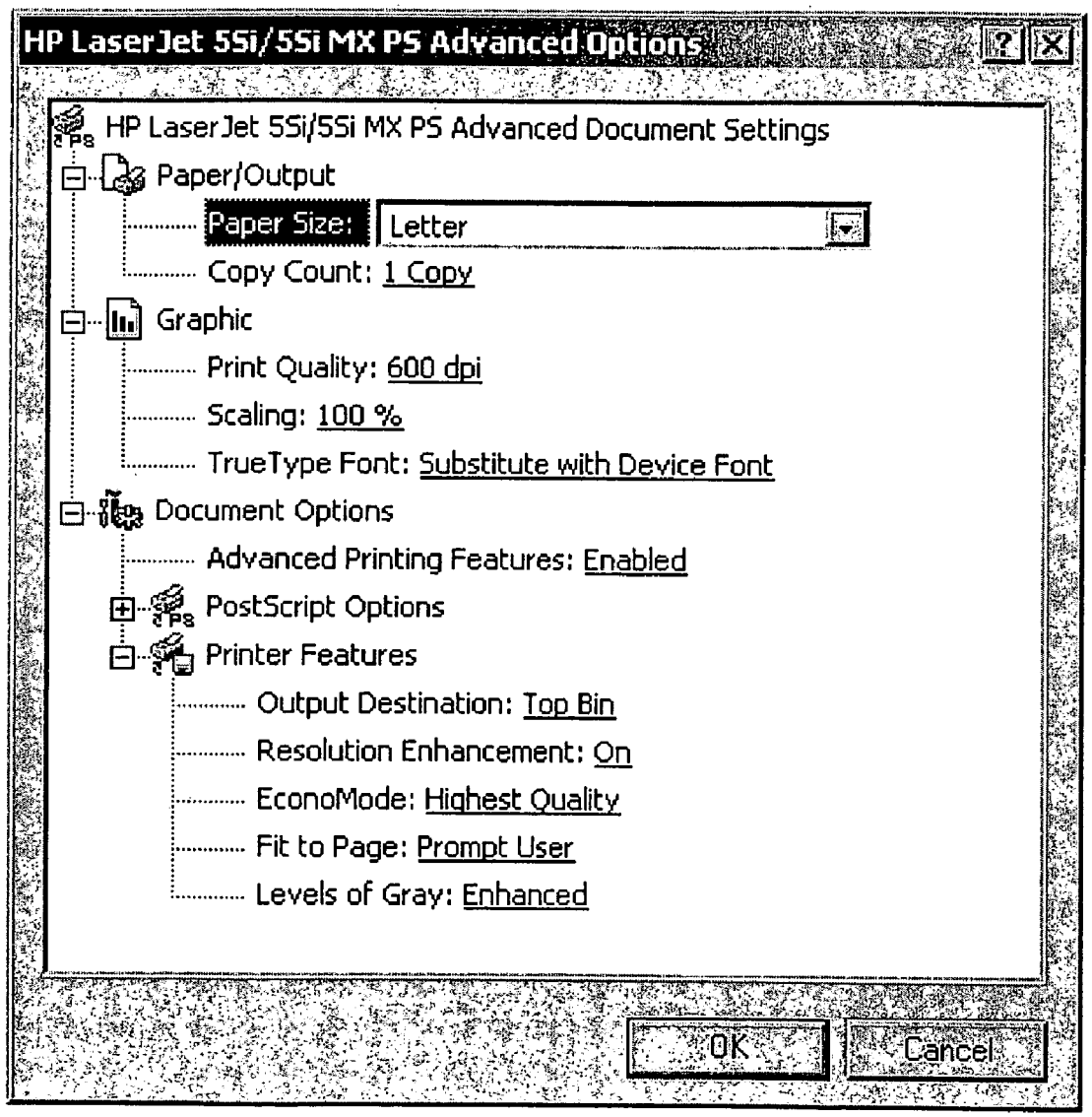
FIG. 4 is an exemplary user interface according to the present invention invention.

The user interface, as shown in FIG. 4, contains all of the options of the printer 90. The unidriver 100, in parsing the GPD file 102, has learned all of the printer 90 options, and has learned how to present them to the user. However, the unidriver 100 does not "know" what those options do. For example, the user cannot instruct the unidriver 100 to print on both sides and expect that the unidriver 100 will know that printing on both sides is called "duplex" in the GPD file 102. Thus, the unidriver 100 will only present the option called "duplex" to the user, and should the user choose to select it, the unidriver 100 will know how to request it from the printer 90. Thus, as can be seen in FIG. 4, the options are underlined, indicating they can be changed by the user. For example, the "600 dpi" under the Print Quality heading could be changed to "300 dpi" should the user so choose. However, the unidriver 100 will not present an option of "1200 dpi" unless the GPD file 102 contained such an entry. If the GPD file 102 did contain an entry for "1200 dpi" then that option would be presented to the user as well.

Contained in the additional files 103 can be executable code, which can be transferred from the printer 90 to the computer 20 and executed without any incorporation by the unidriver 100. The unidriver 100 allows for such "drop-in" code. For example, if there was a particular option on the printer 90, for which no adequate user interface could be generated from the menu of user interface commands available through the unidriver 100, the GPD file 102 could simply reference a section of executable code which would bypass the unidriver entirely, by presenting the option to the user itself and then executing it on the printer 90 itself, without the aid of the unidriver.

The unidriver 100 and corresponding minidrivers are described in more detail in U.S. Pat. No. 5,604,842 for a METHOD AND SYSTEM FOR INTERFACING WITH A COMPUTER OUTPUT DEVICE, assigned to the assignee of the present invention, and hereby incorporated by reference in its entirety. An alternative implementation using a unidriver 100 and a GPD file 102 is described in more detail in co-pending application Ser. No. 09/157,895, for a MODULAR AND EXTENSIBLE PRINTER DEVICE DRIVER AND TEXT BASED METHOD FOR CHARACTERIZING PRINTER DEVICES FOR USE THEREWITH, also assigned to the assignee of the present invention, and also incorporated herein by reference in its entirety.

The GPD file 102, together with the additional files 103 can be located in the memory storage of a peripheral 70. As will be known by those skilled in the art, memory storage can include the peripheral memory 72 as well as any other storage such as a PC card storage 81, a floppy driver storage 82, a hard driver storage (not shown), or the like. When the peripheral 70 is connected to the computer 20, such as printer 90 as shown in FIG. 3, the computer 20 and the printer 90 exchange preliminary communications, in a manner known in the art, to establish their presence to one another. The communications between the printer 90 and computer 20 use a known protocol, such as the Simple Network Mail Protocol (SNMP). Once the computer 20 and the printer 90 have established their connection, the computer 20 can load the appropriate software, such as the universal printer driver 100, since the peripheral 70 was a printer 90. Alternatively, a universal scanner driver could be loaded if the peripheral 70 was a scanner. The universal printer driver 100 queries the printer 90 for the GPD file 102 resident in the printer memory storage. For example, using the SNMP protocol, a GET command would be used. Specifically, the computer 20 would GET the value of one or more predefined Object Identifiers, or OIDs. When the connection is first established, the computer 20 does not know anything about the peripheral 70 to which it is attached. Thus a predefined OID must be used, such that the computer 20 can GET that OID every time and find, either a GPD file 102 or a pointer to the GPD file 102.

Figure 5:
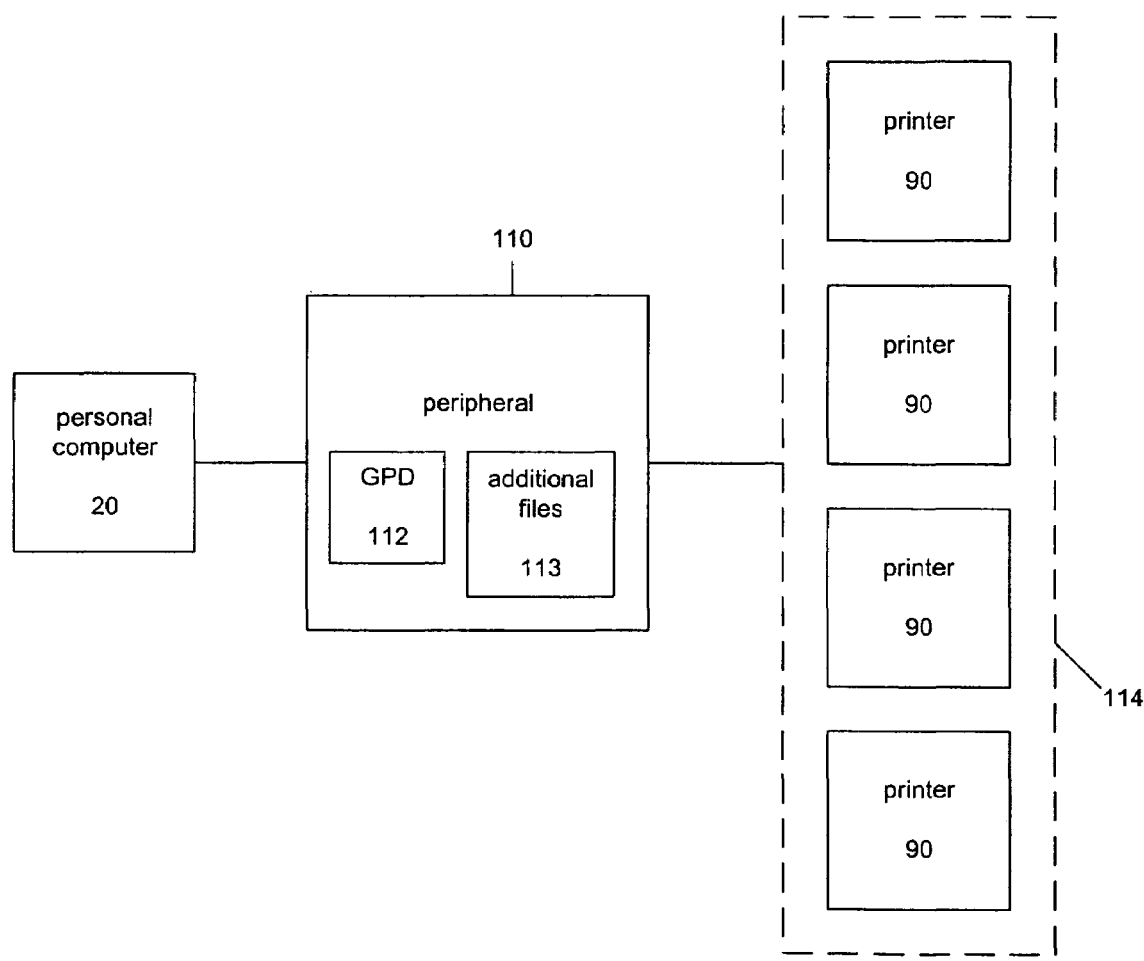
FIG. 5 is a block diagram generally illustrating an alternative connection between a computer and a peripheral.

The GPD 102 and additional files 103 are not required to be located in or near the physical peripheral 70. Thus, they could be located on a remote storage unit, or on a different peripheral 110. For example, a corporation could set up a series of printers 90 as a printer bank 114, as shown in FIG. 5. The peripheral 110 could act as a central receiving station for print jobs from the entire corporation. In such a case, the peripheral 110 could contain a GPD file 112 and additional files 113 which represents the capabilities of all of the printers in the printer bank 96. Thus, even if only one of the printers in the printer bank 96 had the ability to print at 1200 dpi, the GPD 112 contained in the peripheral 110 would contain an entry detailing such an option, and the appropriate command to the computer 20. The peripheral 110 would, in turn, control the printer bank 114. For example, when a computer 20 submitted a print job which required printing at 1200 dpi, the computer would instruct the peripheral 110 to do the job. The peripheral 110 could then send that job to the appropriate printer 90 in the printer bank 114, which could print at such a resolution.

The GPD 112 and additional files 113 contained on the peripheral 110 could contain entries whose values were not printer 90 codes, but rather peripheral 110 codes. The GPD 112 would, therefore, provide the computer 20 with the necessary codes to instruct the peripheral 110 to perform the appropriate tasks. The peripheral 110 would then translate the instruction received from the computer 20 into the appropriate instruction to the particular printer 90 to which the print job was ultimately being sent. Thus, the embodiment illustrated in FIG. 5 contains two levels of commands: the GPD 112 resident on the peripheral 110 would teach the computer 20 how to instruct the peripheral 110, and the GPD files 102 resident on the printers 90 would teach the peripheral 110 how to instruct each of the printers 90. As would be obvious to one of skill in the art, the present invention lends itself to such layering.

Figure 6:
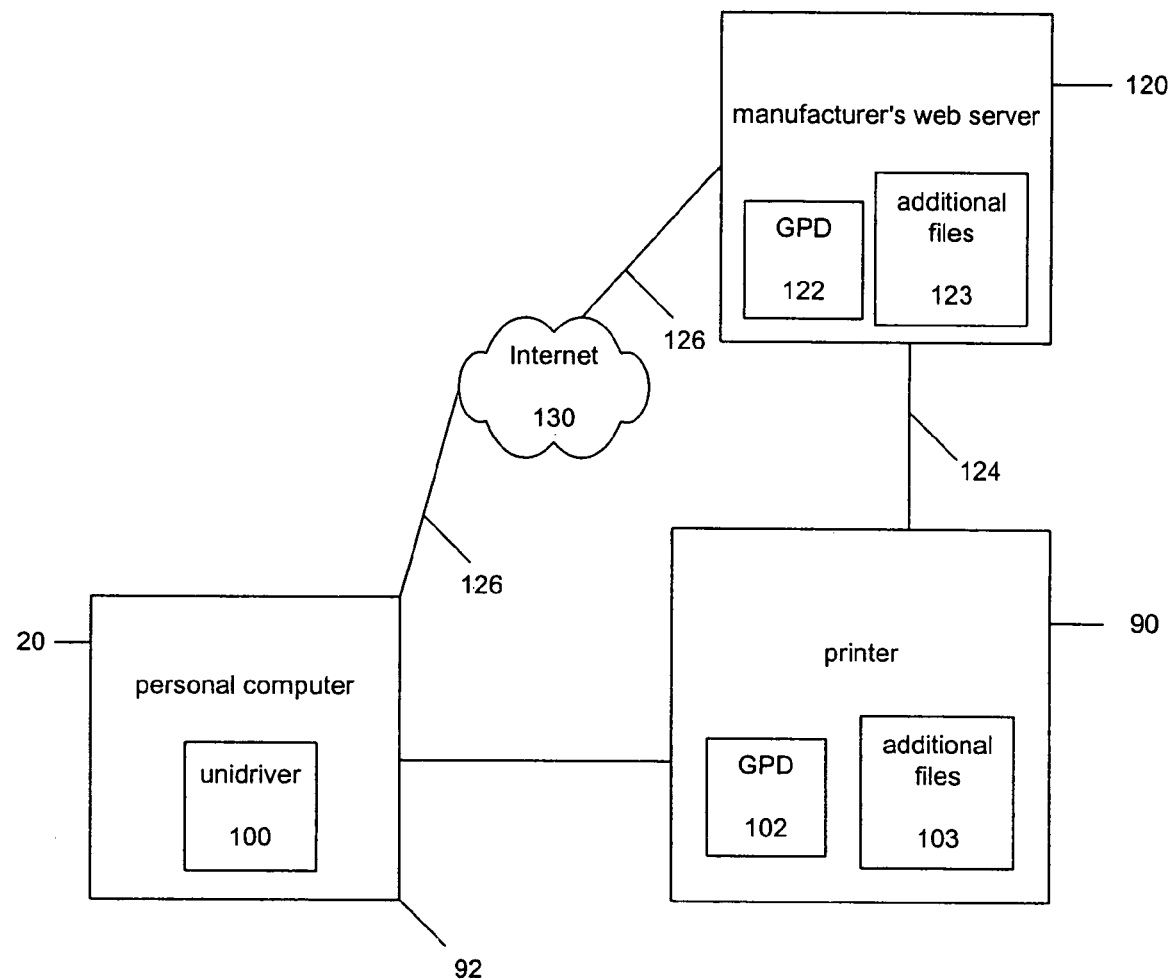
FIG. 6 is a block diagram generally illustrating another alternative connection between a computer and a peripheral.

The GPD 102 and additional files 103 could also be located on a server computer, such as on a LAN or on the Internet. As shown in FIG. 6, a manufacturer's web site 120, for example, could contain the latest versions of the GPD 122 and additional files 123, implementing the latest options for the printer 90. Thus, if the manufacturer developed a new envelope feeder for the printer 90, the appropriate entry could be immediately placed in the GPD 122. For example, using SNMP, when the computer 20 tried to GET the predefined OID at which it could expect a GPD 102, the computer could instead find a pointer to the server 120. As would be known by those skilled in the art, a pointer would be a protocol specified name or address. Thus, the computer 20, following the pointer found at the predefined OID, could make a connection 126 via the Internet 130, for example, to the server 120 and find the latest version of the GPD 122 and additional files 123. In this way, the computer 20 would read the GPD file 122 from the server 120, and thereby obtain the latest printer information.

Other types of peripherals, in addition to printers, also lend themselves to be controlled in the above disclosed manner. For example, a universal scanner driver could read input from a Generic Scanner Description (GSD) file for a scanner. As in the case of a printer GPD 102, the scanner GSD could be a text-based file containing options in name-value entries. The GSD could then be stored in a scanner memory storage, or on a remote server, allowing the computer 20 to learn the scanner options and instructions without requiring the user to find the correct GSD.

All of the references cited herein, including patents, patent applications, and publications, are hereby incorporated in their entireties by reference.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiment shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A system for controlling a peripheral by a computer via a peripheral driver comprising a universal peripheral driver component and a text based generic peripheral description file component, wherein the universal peripheral driver component is physically separate from the text based generic peripheral description file component, the system comprising:

means for accessing, by the universal peripheral driver component, the text based generic peripheral description file component, wherein the universal peripheral driver component is located on the computer, and wherein the text based generic peripheral description filed component is accessed in accordance with a network protocol and is accessed by reference to a pre-defined location of memory storage of the peripheral;

means for reading, by the universal peripheral driver component, device specific device driver functions from a text based characterization contained in the text based generic peripheral description file component; and means for implementing, by the universal peripheral driver component, the device specific device driver functions to control the peripheral in accordance with the text based characterization.

2. A method implemented via a computing device, the method comprising:

controlling a peripheral by the computing device via a peripheral driver comprising a universal peripheral driver and a text based generic peripheral description file, wherein the universal peripheral driver is physically separate from the text based generic peripheral description file, the controlling comprising:

accessing via a network protocol, by the universal peripheral driver, the text based generic peripheral description file by reference to a pre-defined location of memory storage of the peripheral;

reading, by the universal peripheral driver, device specific device driver functions from a text based characterization contained in the text based generic peripheral description file; and implementing, by the universal peripheral driver, the device specific device driver functions to control the peripheral in accordance with the text based characterization.

3. A computer-readable medium having computer-executable instructions embedded thereon, the computer-executable instructions when executed by a computing device, performing a method comprising:

controlling a peripheral by the computing device via a peripheral driver comprising a universal peripheral driver and a text based generic peripheral description file, wherein the universal peripheral driver is physically separate from, the text based generic peripheral description file, the controlling comprising:

accessing via a network protocol, by the universal peripheral driver, the text based generic peripheral description file by reference to a pre-defined location of memory storage of the peripheral;

reading, by the universal peripheral driver, device specific device driver functions from a text based characterization contained in the text based generic peripheral description file; and implementing, by the universal peripheral driver, the device specific device driver functions to control the peripheral in accordance with the text based characterization.

* * * * *

UNITED STATES PATENT AND TRADEMARK OFFICE
CERTIFICATE OF CORRECTION

| | | |
|---|---|---|
| PATENT NO. | : 7,421,712 B2 | Page 1 of 1 |
| APPLICATION NO. | : 11/139332 | |
| DATED | : September 2, 2008 | |
| INVENTOR(S) | : Paul Moore | |

It is certified that error appears in the above-identified patent and that said Letters Patent is hereby corrected as shown below:

In column 10, line 23, in Claim 3, delete "from," and insert -- from --, therefor.

Signed and Sealed this
Tenth Day of May, 2011

David J. Kappos
*Director of the United States Patent and Trademark Office*